June 3, 1930.
A. PANSKY
1,761,362
PROCESS FOR THE PREPARATION OF GELATIN
Filed Dec. 14, 1923
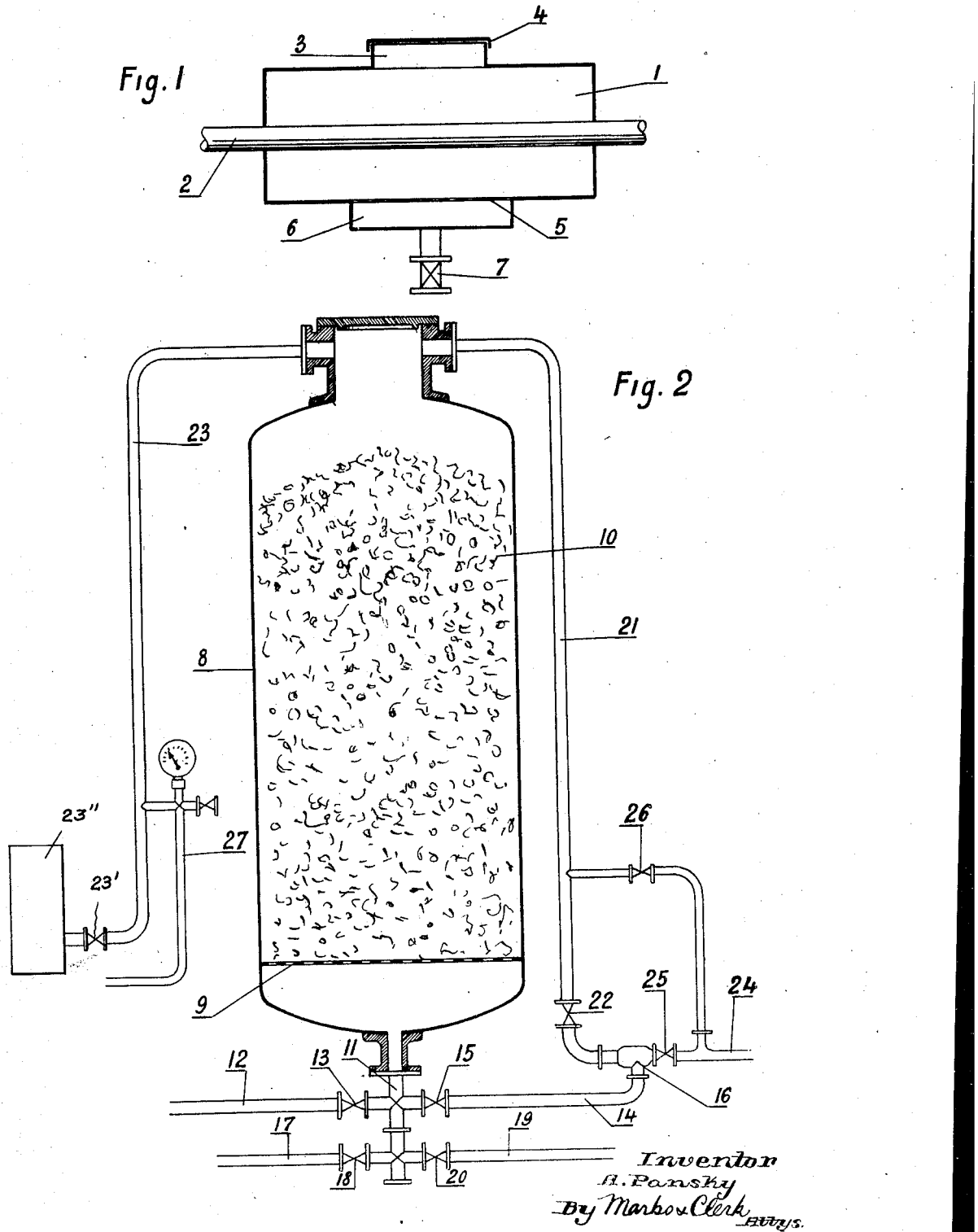

Patented June 3, 1930

1,761,362

UNITED STATES PATENT OFFICE

ADOLPHE PANSKY, OF PARIS, FRANCE

PROCESS FOR THE PREPARATION OF GELATIN

Application filed December 14, 1923, Serial No. 680,774, and in France November 24, 1923.

In the known processes, gelatine is prepared from bones by treating the latter with an inorganic acid, such as hydrochloric, sulphuric, sulphurous or phosphoric acid, in order to dissolve the mineral substances of the bones. The phosphates dissolved in the acids are recovered in the form of bone precipitate; the organic portion of the bones, or ossein, which is insoluble in dilute acids, is washed, steeped in lime water, washed, and then heated in uncovered tanks in the open air, by the use of steam heating.

My invention relates to a process for the preparation of gelatine from bones, wherein the preliminary removal of the mineral matter is dispensed with.

To this effect the bones from any source, from which the fatty matter must be preliminarily removed as usual for example by means of solvents such as benzine, carbon tetrachloride or the like are treated by solutions of a caustic alkali such as sodium hydroxide (NaOH), carbonate of soda ($Na_2CO_3$), potash (KOH) carbonate of potash ($K_2CO_3$), lime $Ca(OH)_2$, and the like, for the extraction of the useless substances from the bones such as amino acids, albumens, peptones, blood, etc., while leaving the mineral structure of the bones intact.

The concentration of the alkaline solution must be a very low one. For example, if sodium hydroxide is employed, its concentration should be less than 1% NaOH with reference to the weight of the treated bones.

This operation is performed at atmospheric temperature so as not to injure the gelatine which begins to decompose at 60° C. in an apparatus which is in constant motion, so as to ensure the close contact of all parts of the bones with the alkaline solution.

After this treatment the bones are washed and treated for the extraction of the gelatine.

In the appended drawings I have shown by way of example two apparatuses respectively adapted for the alkaline treatment and for the subsequent extraction of the gelatine.

Figs. 1 and 2 are vertical diagrammatical sections respectively of these two apparatuses.

The apparatus for the alkaline treatment essentially comprises a horizontal cylindrical drum 1 revoluble on the shaft 2. Upon its cylindrical surface, the said drum is provided with an aperture 3 having the cover 4 and adjacent the opposite side of the cylindrical surface the wall of the drum is pierced with the holes 5 communicating with a small chamber 6 which is provided with a discharge cock 7.

The operation is as follows:

The cock 7 being closed, I introduce the bones and the alkaline solution into the drum through the aperture 3, before placing on the cover 4 and rotating the drum. When the operation is completed, the drum is stopped in the position where the chamber 6 is at the lower part; the cock 7 is then opened and the solution thus discharged. The drum is then given half a turn so as to bring the aperture 3 to the bottom, and the treated bones are discharged through the latter.

The bones are then washed in water at about 25 to 30° C. until they are entirely neutral, and are then treated for the extraction of the gelatine. Since by reason of the non-removal of the mineral matter from the bones, the weight of the substance to be heated is much greater than in the known methods in which only the ossein is subjected to the action of steam, the said known methods using steam heating in uncovered tanks would be, in this case, of very small efficiency.

The operation may for instance be performed as follows:

The bones after washing are placed in an extraction vessel and extracted with water circulated by means of a steam injector. In order that this may take place under the best conditions it is necessary that the temperature of the liquid in movement be not carried above 60° C.

The operation takes place in the following manner: Before beginning to extract with water, steam at a slight pressure above atmospheric is admitted into the extraction vessel for the purpose of hydrolyzing part of the collagenous substance, then, the extraction vessel is connected with the chamber subjected to a partial vacuum, and adapted to reduce the pressure in the extraction vessel to a degree such as will cause the temperature to fall below 60° C. At the same time the extraction water is set in circulation. When the temperature of the water heated by the steam jet has risen to 60° C. the circulation is stopped, steam is again admitted into the extraction vessel and the cycle of operation re-begun and carried on until all the gelatine contained in the bones has been completely extracted. Due to this arrangement, the temperature in the extraction vessel during the circulation of the water can be maintained close to 60° C. thereby avoiding a rise of temperature which would act against the good preservation of the gelatine. It will be seen, by this method, that the gelatine is extracted by the water under 60° C., and discharged by the water with the same. The mass remaining in the apparatus comprises not only the mineral matter of the bones but also all matters such as ossein which have not been destroyed by the alkaline treatment. Also the reaction on the bones is more rapid than by ordinary methods and requires less liquid for a given quantity of gelatine extracted, the amount of water being about equal to that of the bones treated, and this also results in considerable economy of the steam used.

In the construction shown (Fig. 2) the closed extraction vessel 8 is provided near the bottom with a grating 9 upon which are placed the bones 10. At the bottom, the vessel 8 is connected to a conduit 11 connected on the one hand with a water inlet pipe 12 provided with the cock 13 and having in line therewith the pipe 14 provided with a cock 15 and leading to a steam injector 16, and on the other hand with a drain pipe 17 provided with the cock 18, and with a discharge pipe for the solutions 19 provided with a cock 20. A conduit 21 provided with the cock 22 serves to connect the injector 16 with the top of the vessel 8, the latter being also connected by the conduit 23 provided with a cock 23' with a chamber 23" subjected to a partial vacuum.

A steam inlet pipe 24 may be connected on the one hand by the cock 25 with the injector 16, and on the other hand by the cock 26 with the conduit 21, forwardly of the said injector. The vessel 8 may be connected with the atmosphere when necessary by means of the pipe 27.

The operation is as follows:

The cocks 13, 15, 18, 20 and 25 being closed, the cock 26 is opened so as to admit steam at a slight pressure into the vessel 8. The cock 26 is then closed and the cock 13 opened, keeping the cock 15 closed, and in this manner a certain amount of water which is determined by experience according to circumstances is admitted into the vessel 8 which latter is now subjected to reduced pressure in as much as it is kept in connection with the vacuum chamber by the conduit 23" whereby the temperature is reduced to 30 or 40° C. The cocks 15, 25 and 22 are then opened, cock 13 being closed, so as to provide for the injection of steam required to ensure the circulation of the water and this injection continues until the water has reached the maximum temperature (60° C.) allowed. At this moment the circulation is stopped, the water with the gelatine it has exhausted being removed. The process is repeated with fresh water until the whole gelatine is exhausted the exhaustion requiring as stated above, about the same weight of water as of bones, the number of injections and consequently the amount of water circulating at a time being determined according to circumstances without having a primary importance for the proper execution of my process.

What I claim is:

1. A process for the preparation of gelatine from bones freed of fatty matter without preliminary removal of mineral matter, which comprises subjecting the bones to the action of a dilute solution of a caustic alkali to dissolve organic matter other than proteins, washing the bones with water to free them of excess alkali, subjecting the so treated bones to the action of low pressure steam to hydrolyze the collagenous matter into gelatine, and treating the hydrolyzed material with water at a temperature not greater than 60° C. to extract the gelatine.

2. A process for the preparation of gelatine from bones freed of fatty matter without preliminary removal of mineral matter, which comprises subjecting the bones to the action of a dilute solution of caustic soda to dissolve organic matter other than protein, washing the bones with water to free them of excess caustic soda, subjecting the so treated bones to the action of low pressure steam to hydrolyze the collagenous matter into gelatine, and treating the hydrolyzed material with water at a temperature not greater than 60° C. to extract the gelatine.

In witness whereof I have hereunto set my hand.

ADOLPHE PANSKY.